(12) United States Patent
Matsunaga et al.

(10) Patent No.: US 9,747,534 B2
(45) Date of Patent: Aug. 29, 2017

(54) PRINTING SYSTEM WITH VISUAL RECOGNITION UNIT

(71) Applicant: FUJI XEROX CO., LTD., Tokyo (JP)

(72) Inventors: Atsuo Matsunaga, Kanagawa (JP);
Masayuki Kudo, Kanagawa (JP);
Takayuki Matsui, Kanagawa (JP);
Masashi Murakami, Kanagawa (JP);
Keiji Ishiguro, Kanagawa (JP);
Kazuhide Kobayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 28 days.

(21) Appl. No.: 14/872,742

(22) Filed: Oct. 1, 2015

(65) Prior Publication Data
US 2016/0314382 A1 Oct. 27, 2016

(30) Foreign Application Priority Data

Apr. 23, 2015 (JP) ................. 2015-088238

(51) Int. Cl.
| | | |
|---|---|---|
| B41J 15/00 | (2006.01) | |
| B41J 29/38 | (2006.01) | |
| B41J 29/387 | (2006.01) | |
| H04N 1/00 | (2006.01) | |
| G06K 15/02 | (2006.01) | |
| G06K 15/16 | (2006.01) | |
| G06K 15/00 | (2006.01) | |
| G06F 3/12 | (2006.01) | |

(52) U.S. Cl.
CPC ....... *G06K 15/1809* (2013.01); *G06F 3/1204* (2013.01); *G06F 3/1207* (2013.01); *G06F 3/1256* (2013.01); *G06F 3/1282* (2013.01); *G06K 15/16* (2013.01); *G06K 15/4065* (2013.01)

(58) Field of Classification Search
CPC ............... G06K 15/1809; G06K 15/16; G06K 15/4065; G03G 15/6517; G03G 15/652; B41J 15/00; B41J 29/38; B41J 29/387; H04N 1/0035; H04N 1/00352; H04N 1/00355; H04N 1/00358; H04N 1/0036; H04N 1/00363; H04N 1/00366; H04N 1/00368; H04N 1/00371; H04N 1/00374; H04N 1/00376; H04N 1/00379
USPC ................................... 358/1.15, 498
See application file for complete search history.

(56) References Cited

U.S. PATENT DOCUMENTS 3,576,367 A * 4/1971 Sable ................ G03G 15/22
101/226
6,096,150 A * 8/2000 Ohno ................ B65H 19/1821
156/157

FOREIGN PATENT DOCUMENTS

| JP | 6-166226 A | 6/1994 |
| JP | 2007-310520 A | 11/2007 |
| JP | 2012-145768 A | 8/2012 |

* cited by examiner

*Primary Examiner* — Eric A Rust
(74) *Attorney, Agent, or Firm* — Sughrue Mion, PLLC

(57) ABSTRACT

Provided is a printing device including a print data receiving unit, a page calculation unit that calculates a number of pages before stopping with using a page length of received print data and a distance from a printing mechanism unit to a visual recognition unit, a print instruction unit that changes the number of pages before stopping or a number of printed pages and performs print processing when the received print data corresponds to a control page for controlling printing, and a print stop unit that stops printing when the number of printed pages coincides with the number of pages before stopping.

12 Claims, 17 Drawing Sheets

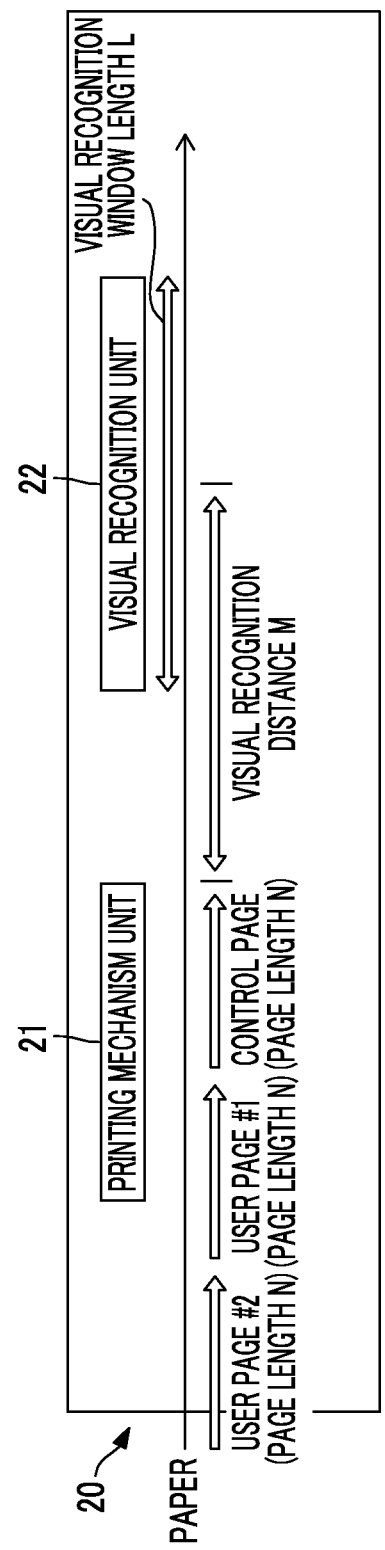

FIG. 3A

JOB START 34/56/2012 78:90

JOB NAME ABCD

CONTROL PAGE
(JOB SEPARATOR PAGE)

FIG. 3B

PAY STATEMENT FOR [MARCH] [2015]     NAME [FULL NAME]

BASE SALARY [500000JPY]

ALLOWANCE

DEDUCTION, TAX, SOCIAL SECURITY [50000 JPY]

USER PAGE
(FORM)

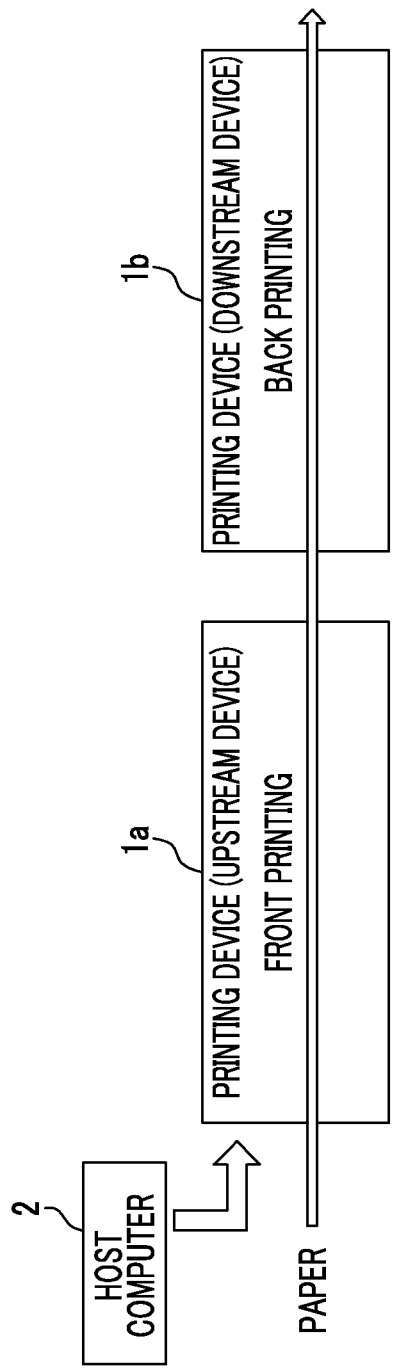
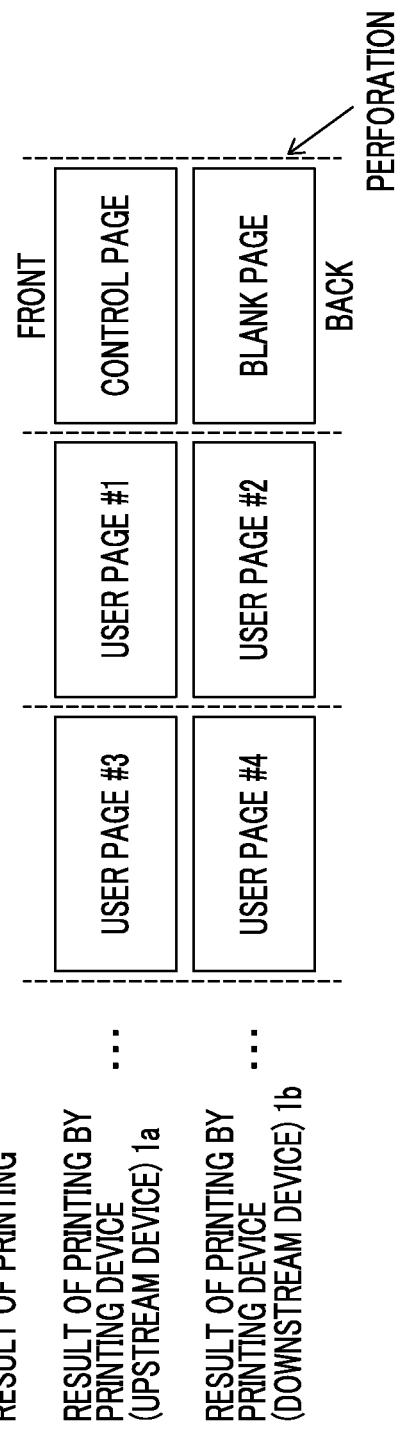

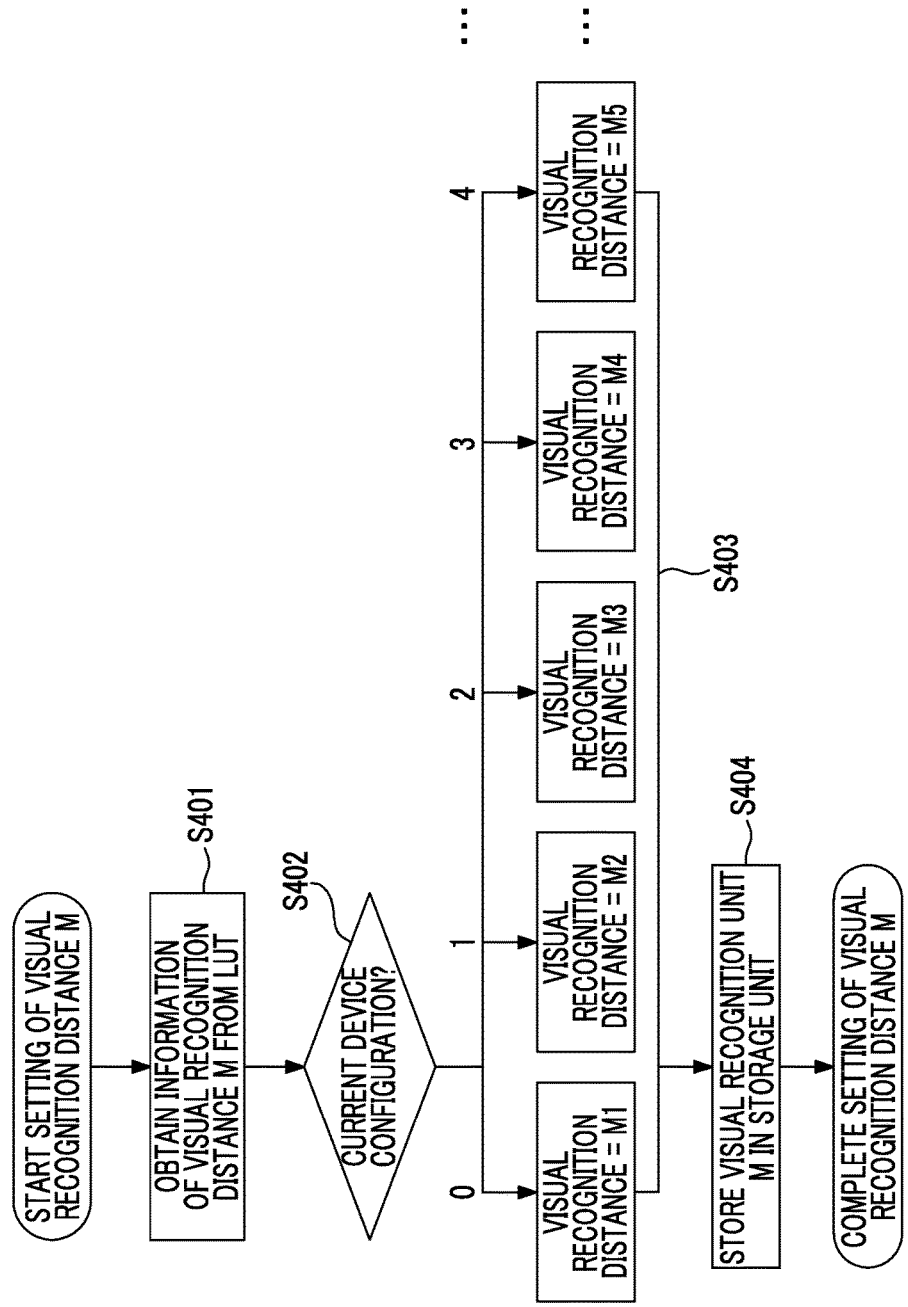

FIG. 11B

| | DEVICE CONFIGURATION | VISUAL RECOGNITION DISTANCE |
|---|---|---|
| 0 | SINGLE DEVICE (INTERNAL STACKER + VISUAL RECOGNITION UNIT) | M1 |
| 1 | SINGLE DEVICE (INTERNAL STACKER) | M2 |
| 2 | SINGLE DEVICE (POST-PROCESSING DEVICE) | M3 |
| 3 | CONTINUOUS UPSTREAM DEVICE | M4 |
| 4 | CONTINUOUS UPSTREAM DEVICE (VISUAL RECOGNITION UNIT) | M5 |
| 5 | CONTINUOUS DOWNSTREAM DEVICE (INTERNAL STACKER) | M6 |
| 6 | CONTINUOUS DOWNSTREAM DEVICE (INTERNAL STACKER + VISUAL RECOGNITION UNIT) | M7 |
| 7 | CONTINUOUS DOWNSTREAM DEVICE (POST-PROCESSING DEVICE) | M8 |

PRINTING SYSTEM WITH VISUAL RECOGNITION UNIT

CROSS-REFERENCE TO RELATED APPLICATIONS

This application is based on and claims priority under 35 USC 119 from Japanese Patent Application No. 2015-088238 filed Apr. 23, 2015.

BACKGROUND

Technical Field

The present invention relates to a printing device and a printing system.

SUMMARY

According to an aspect of the invention, there is provided a printing device including:

a print data receiving unit;

a page calculation unit that calculates a number of pages before stopping with using a page length of received print data and a distance from a printing mechanism unit to a visual recognition unit;

a print instruction unit that changes the number of pages before stopping or a number of printed pages and performs print processing when the received print data corresponds to a control page for controlling printing; and a print stop unit that stops printing when the number of printed pages coincides with the number of pages before stopping.

BRIEF DESCRIPTION OF THE DRAWINGS

Exemplary embodiments of the present invention will be described in detail based on the following figures, wherein:

FIG. 2 is an explanatory diagram of an exemplary configuration of a printing unit;

FIGS. 3A and 3B are diagrams illustrating an exemplary control page and an exemplary user page, where FIG. 3A illustrates an exemplary control page (job separator page) and FIG. 3B illustrates an exemplary user page;

FIG. 7A illustrates a case before printing is started, FIG. 7B illustrates a case in which a visual recognition distance is set as M that is a physical distance (actual distance), and FIG. 7C illustrates a case in which the visual recognition distance is set as M' that is different from the physical (actual) distance M;

FIGS. 9A and 9B are explanatory diagrams of a case in which two printing devices are coupled, where FIG. 9A is an explanatory diagram of a configuration of the printing devices and FIG. 9B is an explanatory diagram of a state of printing on paper;

FIG. 10A illustrates an exemplary printing device with a visual recognition unit provided therein, FIG. 10B illustrates an exemplary printing device that does not include a visual recognition unit therein and performs visual recognition by a stacker, and FIG. 10C illustrates an exemplary printing device that includes a post-processing device and a visual recognition unit provided before the post-processing device;

FIGS. 11A and 11B are an exemplary flowchart of a method of setting the visual recognition distance M when the visual recognition distance M is different depending on a configuration of a printing device and an exemplary reference table stored in a storage unit, where FIG. 11A is the exemplary flowchart of the method of setting the visual recognition distance M and FIG. 11B is an exemplary reference table (LUT)

DETAILED DESCRIPTION

Hereinafter, a description will be given of exemplary embodiments of the present invention with reference to accompanying drawings.

First Exemplary Embodiment

Figure 1:
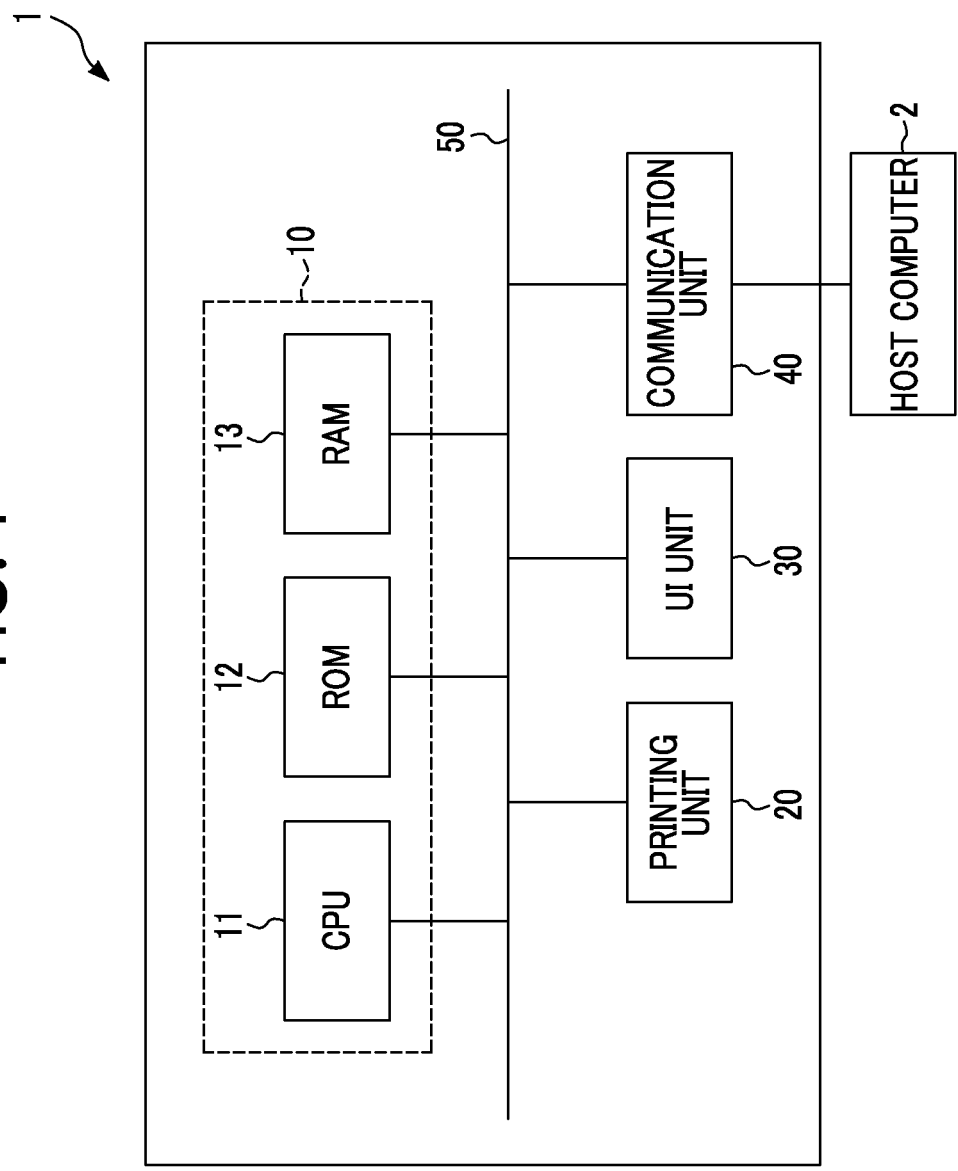
FIG. 1 is a diagram illustrating an exemplary hardware configuration of a printing device (printer) according to a first exemplary embodiment.

FIG. 1 is a diagram illustrating an exemplary hardware configuration of a printing device (printer) 1 according to a first exemplary embodiment.

The printing device 1 according to the first exemplary embodiment is provided with a control unit 10, a printing unit 20, a UI unit 30, and a communication unit 40. The respective functional units are connected to a bus 50 and exchange data via the bus 50.

The communication unit 40 is connected to a host computer 2 that is provided outside the printing device 1.

The control unit 10 controls the aforementioned respective functional units provided in the printing device 1. Here, the control unit 10 is provided with a central processing unit (CPU) 11, a read only memory (ROM) 12, and a random access memory (RAM) 13.

The ROM 12 stores a control program that is executed by the CPU 11. The CPU 11 reads the control program stored in the ROM 12 and executes the control program by using the RAM 13 as a work area. If the CPU 11 executes the control program, the respective functional units in the printing device 1 are controlled.

The ROM 12 that stores the control program may be a magnetic recording medium (such as a magnetic tape or a magnetic disk), an optical recording medium (such as an optical disc), a magnet-optical recording medium, or a semiconductor memory, for example. In addition, the control program may be downloaded from the host computer 2 to the control unit 10 via the communication unit 40 by using a communication mechanism such as the Internet.

The printing unit 20 is provided with a printing mechanism unit 21 (see FIG. 2 which will be described later) that forms a toner image in accordance with image data on a recording medium, such as paper, by an electrophotographic scheme, for example.

The UI unit 30 is configured such that a display device of liquid crystal, for example, and an input device such as a touch panel are integrated. The UI unit 30 displays data relating to the printing device 1, for example, on a display screen of the display device under control by the control unit 10. In addition, the UI unit 30 receives a user operation via the touch panel.

The communication unit 40 is connected to the host computer 2. The communication unit 40 may function as a communication interface connected to a communication line, which is not shown in the drawing, so as to communicate with other devices connected to the communication line, for example.

The host computer 2 may be connected to the bus 50 without the communication unit 40 provided therebetween.

FIG. 2 is an explanatory diagram of an exemplary configuration of the printing unit 20.

The printing unit 20 is provided with the printing mechanism unit 21 that prints (print processing) print data on pre-printing paper (such as a continuous form; this will be referred to as paper or continuous paper) on which a form is printed in advance, and a visual recognition unit 22 for visually recognizing the printed paper. Here, it is assumed that the paper is fed from the left side (upstream side) to the right side (downstream side) in FIG. 2. That is, the printing mechanism unit 21 is provided on the upstream side while the visual recognition unit 22 is provided on the downstream side.

In addition, the printing unit 20 continuously prints print data on the continuous paper (continuous form) on which a form is printed in advance.

The printing mechanism unit 21 forms a toner image in accordance with print data on the paper by the electrophotographic scheme as described above.

The visual recognition unit 22 includes a visual recognition window with a length L from the upstream side to the downstream side, and provides a place where an operator visually observes the printed paper through the visual recognition window.

In addition, the distance from the end of the printing mechanism unit 21 on the downstream side to the center of the visual recognition unit 22 is regarded as a visual recognition distance M. Moreover, the distance from the upstream side to the downstream side of the visual recognition window of the visual recognition unit 22 is regarded as a visual recognition window length L. Furthermore, the length of each page of the continuous paper from the upstream side to the downstream side is regarded as a page length N.

There is a case in which a control page (control data) for controlling printing, such as a job separator page for identifying a series of printing units (job) or an ejection page for preventing nozzle clogging, is added to the head of the print data. The control page is necessary for the operator of the printing device 1, however the control page is not necessary for a user (a customer who requests the printing). In addition, the page that the user requires will be described as a user page. If there are plural user pages, the pages will be described in a manner such as user pages #1, #2, . . . . The user page #1 is the first page in the feeding of the paper.

That is, the paper enters the printing unit 20 in an order of the control page, the user page #1, the user page #2, . . . as illustrated in FIG. 2. Then, the printing mechanism unit 21 performs printing thereon, and the paper reaches the visual recognition unit 22.

FIGS. 3A and 3B are diagrams illustrating an exemplary control page and an exemplary user page. FIG. 3A illustrates an exemplary control page (job separator page), and FIG. 3B illustrates an exemplary user page. The job separator page as a control page is inserted for the purpose of clearly indicating a border between jobs, that is, for the purpose of sectioning. In FIG. 3A, a job start data (JOB START) and a job name (JOB NAME) are described. As a control page, an ejection page for preventing nozzle clogging may be included in addition to the job separator page.

The user page illustrated in FIG. 3B is a pay statement, where print data such as a name and an amount are printed in accordance with a form printed in advance.

Figure 4:
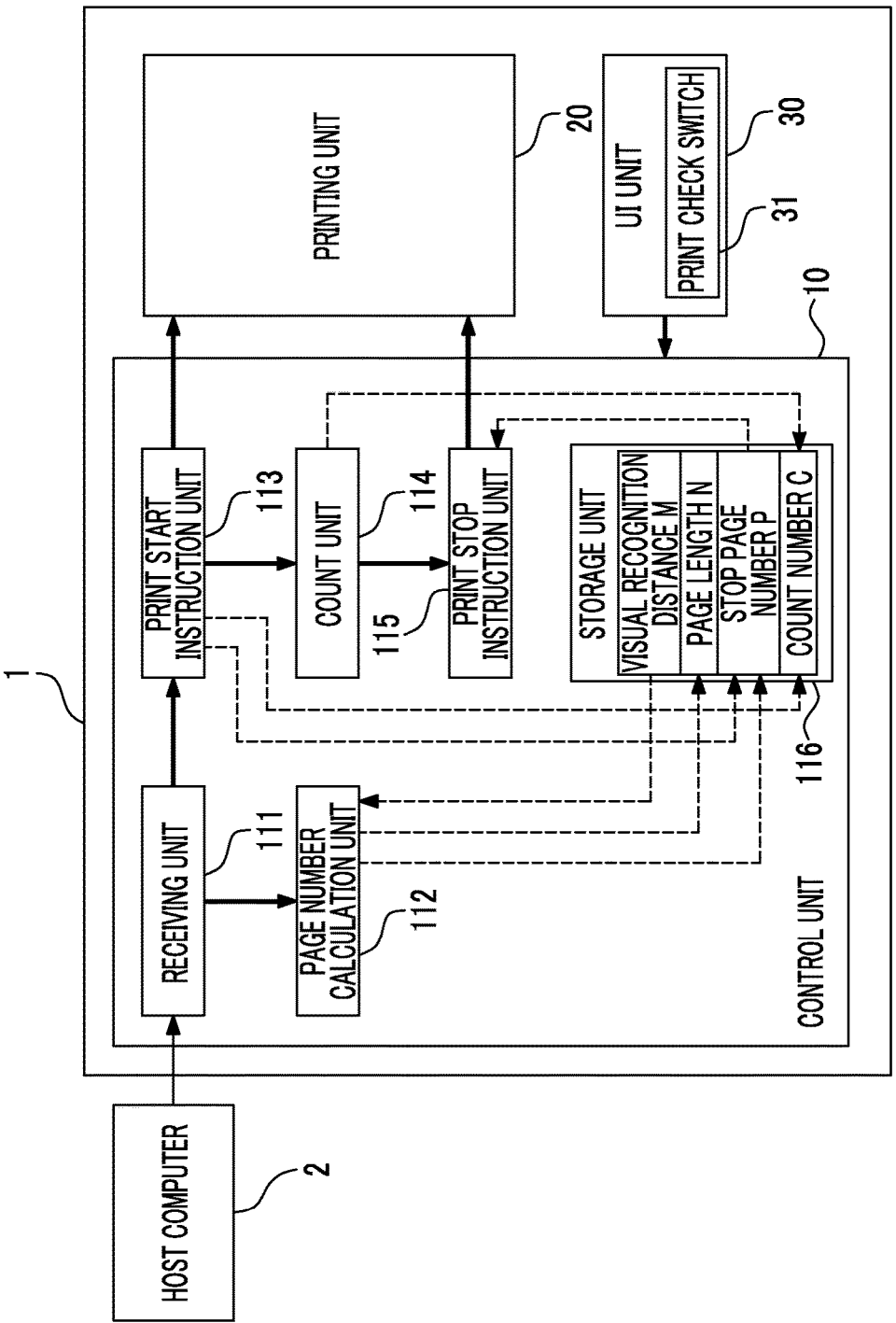
FIG. 4 is a diagram illustrating exemplary functional blocks of a control unit in the printing device (printer)

FIG. 4 is a diagram illustrating an exemplary functional block of the control unit 10 in the printing device (printer) 1. Here, the control unit 10 in the printing device 1, the printing unit 20, and a print check switch 31 in the UI unit 30, and the host computer 2 connected via the communication unit 40 of the printing device 1 in FIG. 1 are illustrated.

The printing device 1 has a continuous print mode for continuously performing printing on the continuous paper and a print check mode for checking a printing position.

The print check switch 31 is a switch that is displayed on the display device of the UI unit 30 and is operated by the operator of the printing device 1. If the operator presses the print check switch 31, which is displayed on the display device of the UI unit 30, via the touch panel, the control unit 10 switches the printing device 1 from the continuous printing mode to the print check mode.

In addition, the print check switch 31 may be provided outside the UI unit 30.

Here, the print check means checking whether or not a position (printing position) on which printing is performed based on print data corresponds to the form printed in advance on the continuous paper (print state).

For example, there is a case in which printing is performed at a printing position deviated from the form printed in advance, due to positional deviation caused when the paper is set. Therefore, it becomes necessary to finely adjust the position of the paper and to retry the printing. In contrast, if printing is performed without causing any deviation of the printing position with respect to the form printed in advance, the printing is continued.

Therefore, the print check is performed for the user page #1 on which printing is performed first. However, the page printed first corresponds to the control page instead of the user page #1 if the control page is included as described above. Therefore, there is no meaning if the print check is performed for the first page (control page).

That is, the continuous printing mode is a mode in which printing is continuously performed on continuous paper, such as a continuous form, based on print data. In contrast, the print check mode is a mode in which the operator checks whether or not printing is performed without causing any deviation between the form printed in advance on the continuous form and the printed data. If the printing of the preset user page as a target of the print check, such as the user page #1, is completed, the printing is stopped at this time. Then, the operator checks whether or not there is deviation between the form and the printed data.

However, if the visual recognition distance M from the printing mechanism unit 21 to the visual recognition unit 22 is long, it is necessary to cause the visual recognition unit 22 to coincide with the user page as a target of print check.

Next, a description will be given of functional blocks of the control unit 10 in the print check mode with reference to FIG. 4. That is, it is assumed that the print check switch 31 has been pressed to shift from the continuous printing mode to the print check mode.

The control unit 10 is provided with a receiving unit 111, a page number calculation unit 112, a print start instruction unit 113, a count unit 114, a print stop instruction unit 115, and a storage unit 116.

The page number calculation unit 112, the print start instruction unit 113, the count unit 114, and the print stop instruction unit 115 are realized by the CPU 11 illustrated in FIG. 1 based on a program. The receiving unit 111 corresponds to the communication unit 40 illustrated in FIG. 1, and the storage unit 116 corresponds to the ROM 12 and the RAM 13 illustrated in FIG. 1.

Here, the receiving unit 111 is an example of the print data receiving unit. The page number calculation unit 112 is an example of the page calculation unit and the page calculation section. The print start instruction unit 113 corresponds to an example of the print instruction unit or the print instruction section. The count unit 114 is an example of the page accumulation section. The print stop instruction unit 115 is an example of the print stop unit or the print stop section.

The storage unit 116 stores the visual recognition distance M in advance. The visual recognition distance M is fixed depending on the printing device 1.

The receiving unit 111 receives print data from the host computer 2. In addition, the page number calculation unit 112 obtains the page length N from the print data, stores the page length N in the storage unit 116, calculates the number of pages in the visual recognition distance M based on the visual recognition distance M and the page length N, and stores the number of pages in the storage unit 116. The number of pages corresponds to a stop page number P. In other words, the head page reaches the vicinity of the center of the visual recognition unit 22 when printing on P pages has been completed.

The print start instruction unit 113 provides an instruction for start of printing to the printing unit 20.

The control unit 114 accumulates (counts) the number of printed pages (printed page number) and stores a count number C in the storage unit 116.

The print stop instruction unit 115 compares the count number C with the stop page number P. If the count number C reaches the stop page number P, the print stop instruction unit 115 provides an instruction for stop of the printing to the printing unit 20.

Figure 5:
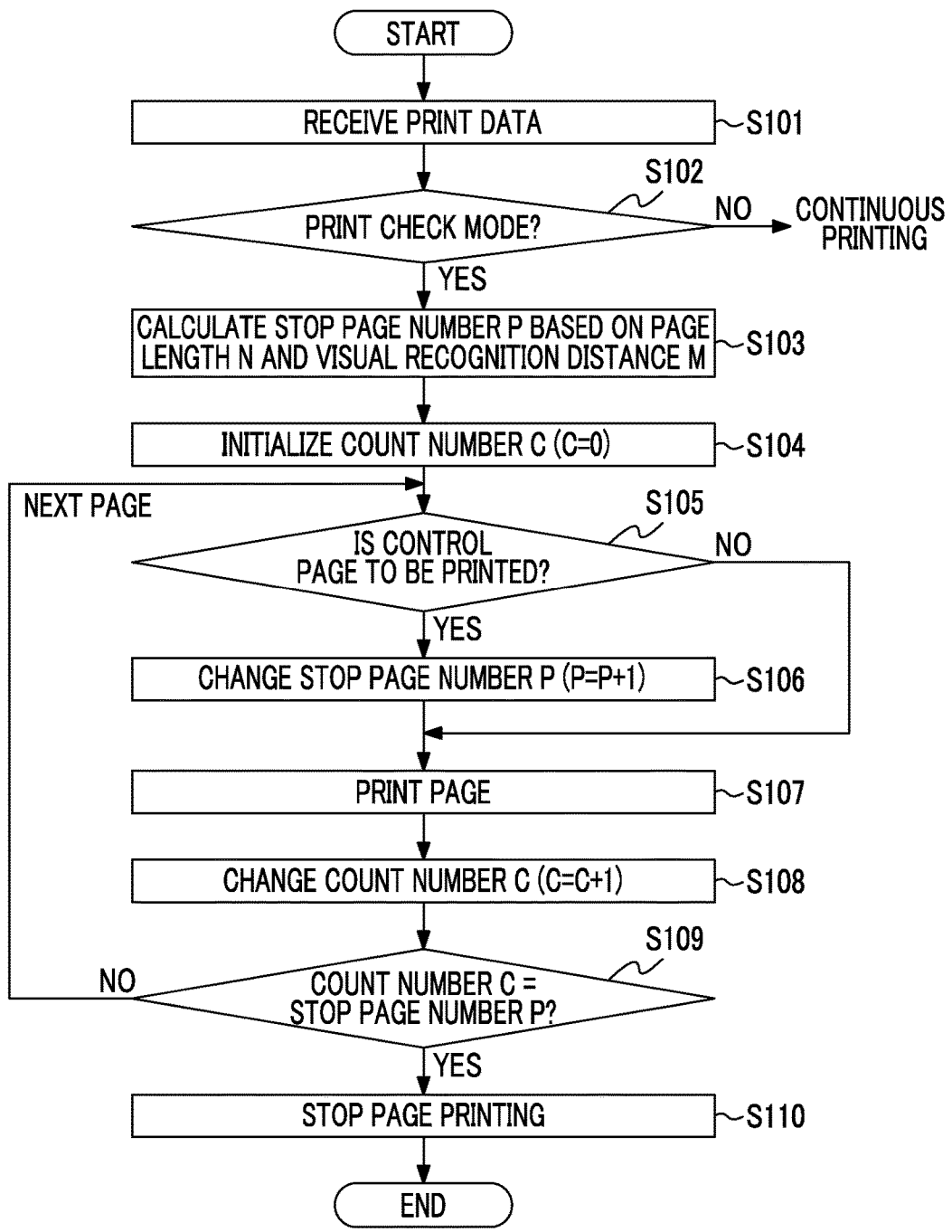
FIG. 5 is a flowchart according to the first exemplary embodiment.

FIG. 5 is a flowchart according to the first exemplary embodiment.

Hereinafter, the flowchart will be described as operations of the control unit 10 in the printing device 1.

First, print data is received from the host computer 2 (Step 101; this is described as S101 in FIG. 5, and the following steps will be described in the same manner).

Next, it is determined whether or not the print check switch 31 has been pressed to set the print check mode (S102).

If a negative (No) determination is made here, that is, if the continuous printing mode has been set, then printing is continued.

In contrast, if a positive (Yes) determination is made, that is, if the print check mode has been set, the print check mode is executed.

Then, the page number calculation unit 112 obtains the page length N from the print data. Furthermore, the page number calculation unit 112 calculates the stop page number P based on the page length N and the visual recognition distance M read from the storage unit 116 (page calculation function) (Step 103).

Then, the count unit 114 sets the count number C as "0" (Step 104).

Next, the print start instruction unit 113 determines whether or not a page to be printed is a control page such as a job separator page (Step 105).

If a positive (Yes) determination is made in Step 105, that is, if the page to be printed is a control page, "+1" is applied (added) to the stop page number P (Step 106).

Then, the print start instruction unit 113 provides an instruction for printing to the printing unit 20 and executes the page printing (print instruction function) (Step 107). In response to the operation, the count unit 114 applied "+1" to the count number C (Step 108).

If a negative (No) determination is made in Step 105, that is, if the page to be printed is not a control page, Step 106 is skipped.

Next, the print stop instruction unit 115 determines whether or not the count number C is equal to the stop page number P (C=P) (Step 109).

If a positive (Yes) determination is made in Step 109, that is, if the count number C is equal to the stop page number P (C=P), the print stop instruction unit 115 stops the page printing performed by the printing unit 20 (print stop function) (Step 110).

If a negative (No) determination is made in Step 109, that is, if the count number C is less than the stoppage number P, the processing returns to Step 105 in which the print start instruction unit 113 determines whether or not the next print page is a control page.

In doing so, the stop page number P is counted up if a control page is included. Therefore, a user page as a target of the print check appears at the visual recognition unit 22. Accordingly, the operator may perform the print check without considering whether or not a control page is included in print data.

Even in a case of using continuous paper with a different page length N, the stop page number P is calculated based on the visual recognition distance M and the page length N. Therefore, the page printing is stopped when the user page #1 reaches the visual recognition unit 22.

As described above, the operator may perform the print check at the user page as a target of the print check without recognizing whether or not the control page is included.

In addition, unnecessary printing is suppressed by checking whether or not there is deviation between the form printed in advance on the continuous paper and the print data at the user page #1 (first form), as compared with a case where the print check is performed after completion of printing of all the pages.

In relation to the determination about whether or not a page to be printed is a control page such as a job separator page, a dedicated code indicating a control page may be added to (provided in) the print data or a print protocol, and the print start instruction unit 113 may identify the control page and the user page by using the dedicated code.

Alternatively, the control page and the user page are identified by extracting features of the pages to be printed.

Second Exemplary Embodiment

According to the first exemplary embodiment, the count unit 114 applies "+1" to the count number C of all the pages on which the printing has been performed (printed pages), and in a case where a control page is included, the count unit 114 changes the stop page number P by applying "+1".

According to a second exemplary embodiment, "+1" is not applied to the count value C if the page to be printed is a control page.

Since the other configurations are the same as those in the first exemplary embodiment, different parts will be described, and descriptions of the same parts will be omitted.

Figure 6:
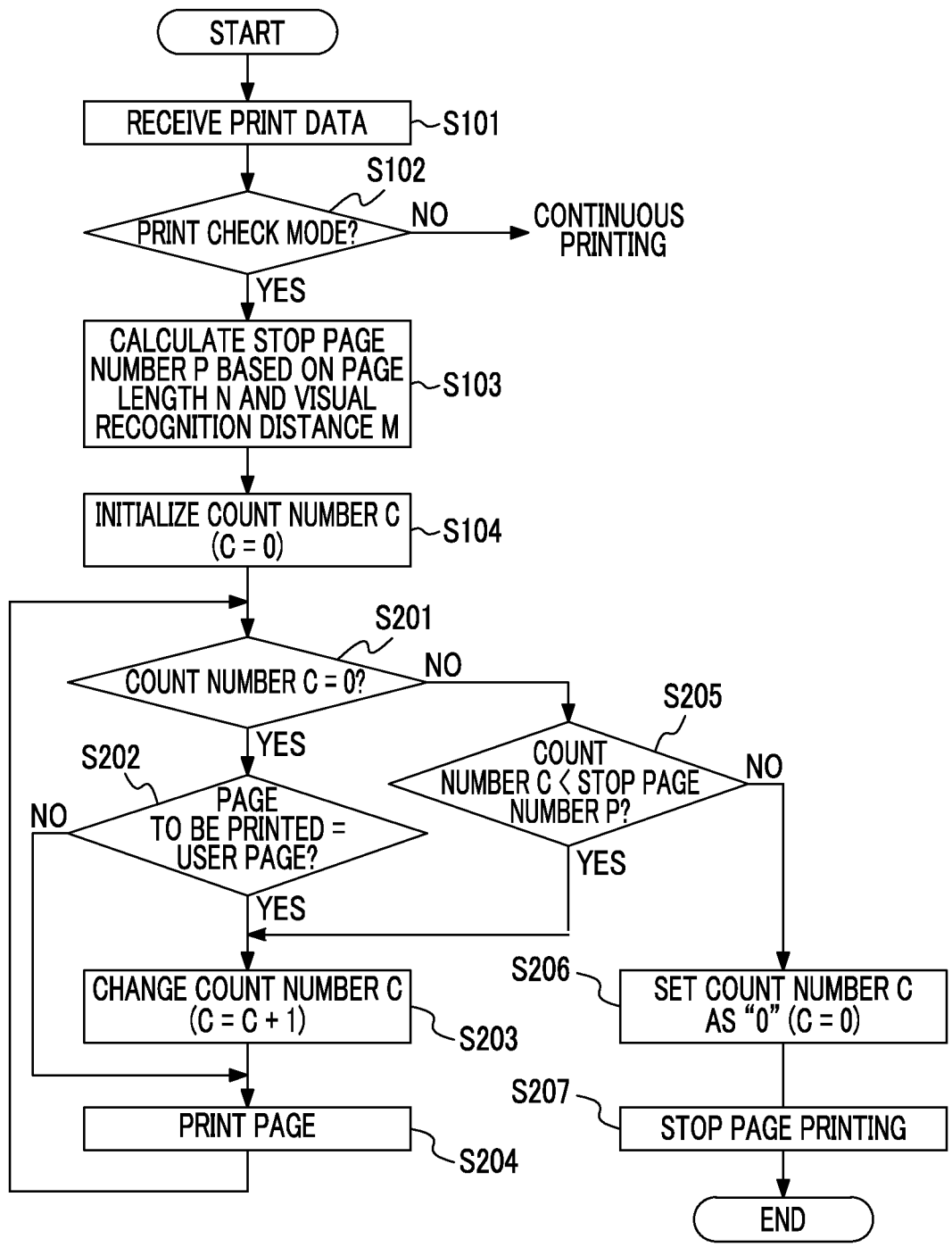
FIG. 6 is a flowchart according to a second exemplary embodiment.

FIG. 6 is a flowchart according to the second exemplary embodiment.

The control page such as a job separator page is placed at the top of print data. If there are plural control pages, the control pages are continuously placed at the top of the print data.

The reception of the print data in Step 101, the determination about whether not the print check mode has been set in Step 102, the calculation of the stoppage number P based on the visual recognition distance M and the page length in Step 103, and the initialization of the count number C in Step 104 ("0" setting) are the same as those in the first exemplary embodiment as illustrated in FIG. 5. Accordingly, the same step numbers are provided thereto, and processing in Step 104 and the following steps will be described below.

First, the count unit 114 of the control unit 10 determines whether or not the count number C is "0" (Step 201).

If a positive (Yes) determination is made in Step 201, that is, if the count number C is "0", it is determined that printing has not yet been started.

Next, the print start instruction unit 113 determines whether or not a page to be printed is a user page (Step 202).

If a positive (Yes) determination is made in Step 202, that is, if the page to be printed is a user page, the count unit 114 applies "+1" to the count number C (Step 203). Then, the printing unit 20 receives the instruction from the print start instruction unit 113 and then executes page printing (Step 204). Then, the processing returns to Step 201.

In contrast, if a negative (No) determination is made in Step 202, that is, if the page to be printed is a control page, Step 203 is skipped, and the printing unit 20 executes the page printing (Step 204). In such a case, the count number C is maintained to be "0". Then, the processing returns to Step 201.

The printing on the first page of the print data is completed by the aforementioned operations, and the processing proceeds to printing of the next page.

In Step 201, the count unit 114 determines whether or not the count number C is "0" again.

If a negative (No) determination is made in Step 202 for the first page, that is, if the page to be printed is a control page, the count number C is maintained to be "0". Therefore, a positive determination is also made in Step 201. Then, the processing in Step 202 and the following steps is repeated.

In contrast, if a positive (Yes) determination is made in Step 202 for the first page, that is, if the page to be printed is a user page, the count number C is equal to or greater than "1". Therefore, a negative determination is made in Step 201.

Next, the print stop instruction unit 115 determines whether or not the count number C is less than the stop page number P (C<P) (Step 205). If a positive (Yes) determination is made in Step 205, that is, if the count number C is less than the stop page number P, processing in Step 203 and the following steps is executed. That is, "+1" is applied to the count number C, and the page printing is executed.

Since the control page is placed at the top of the print data and the count number C is not "0", the printing of the user page has already been started. Therefore, it is not necessary to determine whether or not the page to be printed is a user page at this point. Therefore, if the positive (Yes) determination is made in Step 205, Step 202 is skipped.

In contrast, if a negative (No) determination is made in Step 205, that is, if the count number C is equal to or greater than the stop page number P, the count unit 114 sets the count number C as "0" (C=0) (Step 206). Then, the printing unit 20 stops the page printing in response to the instruction from the print stop instruction unit 115 (Step 207).

As described above, the second exemplary embodiment may be employed instead of the first exemplary embodiment.

Third Exemplary Embodiment

According to the first exemplary embodiment, the stop page number P is obtained by dividing the visual recognition distance M by the page length N (P=M/N) if the distance from the printing mechanism unit 21 to the visual recognition unit 22 is the visual recognition distance M. However, since the page length N varies depending on printing jobs, it is not possible to know whether a page as a target of the print check will be arranged at an optimal position in the visual recognition unit 22.

Figure 7A:
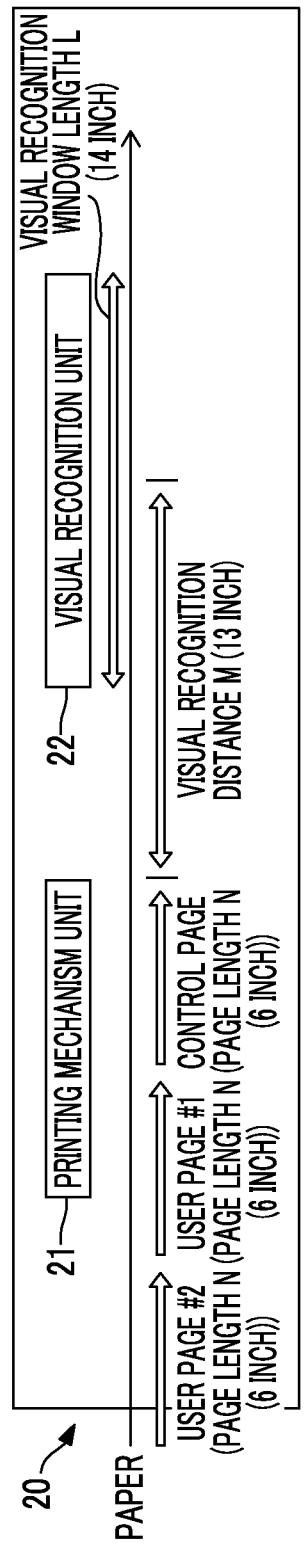
FIGS. 7A to 7C are explanatory diagrams of a relationship between a visual recognition unit and a user page according to a third exemplary embodiment, where
Figure 7B:
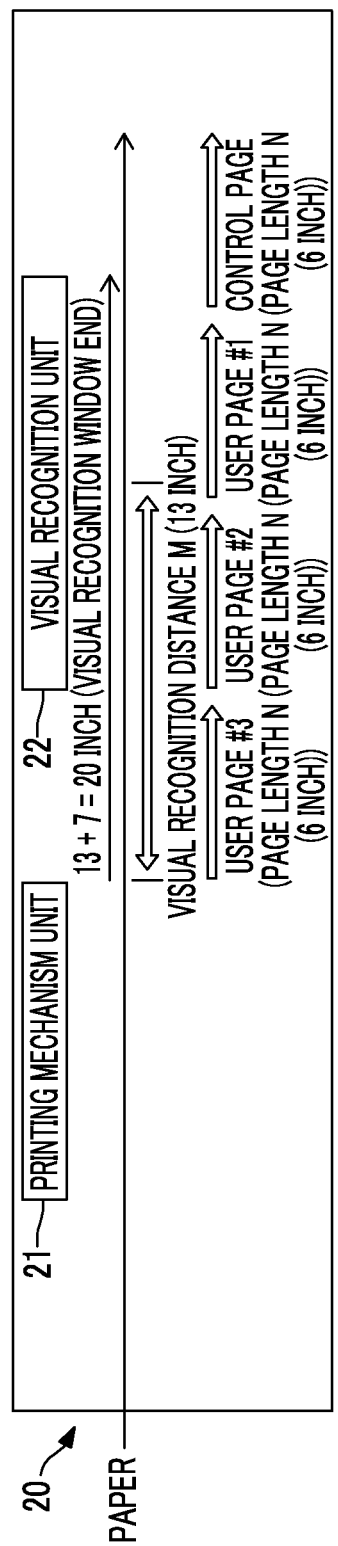
Figure 7C:
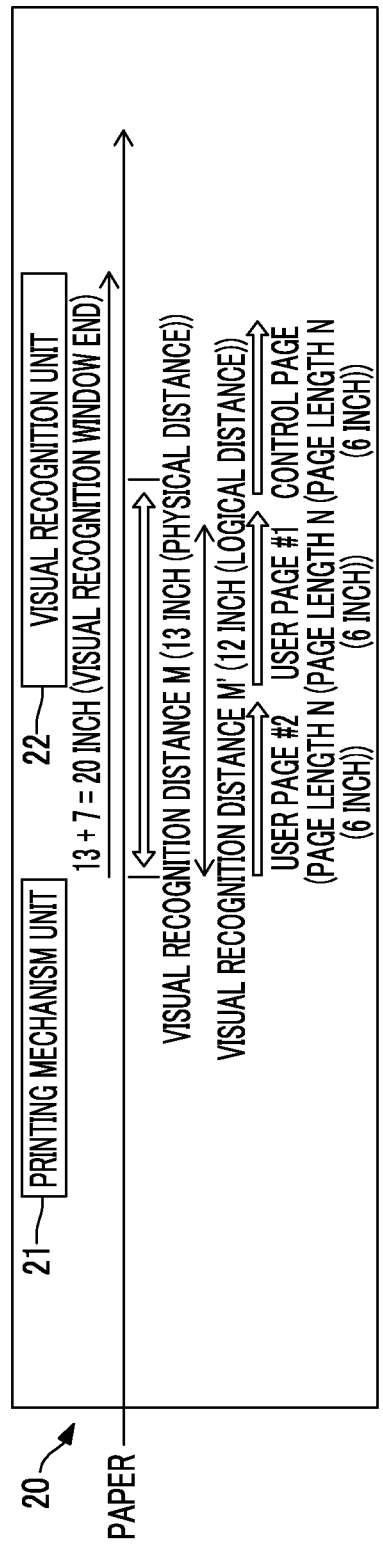

FIGS. 7A to 7C are explanatory diagrams of a relationship between the visual recognition unit 22 and the user page according to the third exemplary embodiment. FIG. 7A illustrates a case before printing is started, FIG. 7B illustrates a case in which the visual recognition distance is set as M that is a physical (actual) distance, and FIG. 7C illustrates a case in which the visual recognition distance is set as M' that is different from M as a physical (actual) distance. In FIG. 7C, the physical visual recognition distance M is described as a physical distance, and the logical visual recognition distance M' is described as a logical distance.

Here, the physical (actual) visual recognition distance M is assumed to be 13 inches, and the visual recognition window length L configuring the visual recognition unit 22 is assumed to be 14 inches. In such a case, an end (the left end in the drawing) of the visual recognition window of the visual recognition unit 22 on the upstream side is arranged at a location with a distance of 6 inches from the end of the printing mechanism unit 21 on the downstream side, and an end thereof on the downstream side (the right end in the drawing) is arranged at a location with a distance of 20 inches from the end of the printing mechanism unit 21 on the upstream side.

As illustrated in FIG. 7A, the print data includes a single control page (job separator page) at the head. In addition, the page length N of each of the control page and the user page in the print data is assumed to be 6 inches.

The stop page number P is obtained by dividing the visual recognition distance M (13 inches) by the page length N (6 inches). Here, the stop page number P is assumed to be 3 by rounding up the value after the decimal point of the quotient. Since a single control page is included, an actual stop page number P is four.

Therefore, an end (the left end in the drawing) of the user page #1 on the upstream side is arranged at a location with a distance of 12 inches from the printing mechanism unit 21, and an end (the right end in the drawing) thereof on the downstream side is arranged at a location with a distance of 18 inches from the printing mechanism unit 21 as illustrated in FIG. 7B. That is, the user page #1 is arranged at a location deviated on the downstream side in the visual recognition window of the visual recognition unit 22.

In this case, three user pages are printed.

In contrast, if the physical (actual) visual recognition distance M, which is 13 inches, is virtually (logically) assumed to be 12 inches (logical visual recognition distance M'), the stop page number P is two that corresponds to a value obtained by dividing the visual recognition distance M' (12 inches) by the page length N (6 inches). Since there is a single control page in this case, the actual stop page number P is three.

Therefore, the end of the user page #1 on the downstream side is arranged at a location with a distance of 6 inches from the printing mechanism unit 21, and the end thereof on the downstream side is arranged at a location with a distance of 12 inches from the printing mechanism unit 21 as illustrated in FIG. 7C. That is, the user page #1 is arranged at a location deviated on the upstream side in the visual recognition window of the visual recognition unit 22.

In this case, two user pages are printed.

It is preferable to perform visual print check on the upstream side in the visual recognition window of the visual recognition unit 22 as compared with performing the visual print check on the downstream side thereof.

If there is deviation between the form and the print data as a result of the print check, the printing is retried. Therefore, it is more preferable to print a smaller number of user pages before the print check.

That is, it is more preferable to change the physical visual recognition distance (physical distance) M (13 inches) to the logical visual recognition distance (logical distance) M' (12 inches).

That is, if the stop page number is calculated based on the physical visual recognition distance M, there is a concern that the user page #1 is arranged on the downstream side in the visual recognition window of the visual recognition unit 22.

Thus, the stop page number is calculated based on the logical visual recognition distance M' instead of the physical (actual) visual recognition distance M in order to arrange the user page #1 at a position for easier visual recognition in the third exemplary embodiment.

Figure 8:
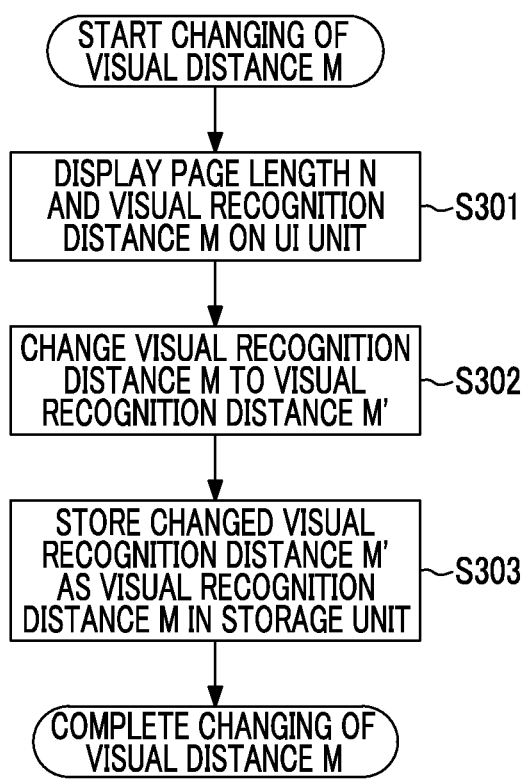
FIG. 8 is an explanatory flowchart of a method of changing the physical visual recognition distance M to a logical visual recognition distance M' according to the third exemplary embodiment.

FIG. 8 is an explanatory flowchart of a method of changing the physical visual recognition distance M to the logical visual recognition distance M' according to the third exemplary embodiment.

Here, it is assumed that the reception of the print data in Step 101, the determination about whether or not the print check mode has been set in Step 102, and the calculation of the stop page number P based on the visual recognition distance M and the page length N in Step 103 in the flowchart illustrated in FIG. 5 have been completed.

Here, a flowchart for the change of the visual recognition distance M in the following steps will be illustrated.

The page length N and the physical visual recognition distance M are displayed on the UI unit 30 (Step 301).

Then, the visual recognition distance M is changed to the visual recognition distance M' (Step 302).

Furthermore, the visual recognition distance M' is stored as the visual recognition distance M in the storage unit 116 (Step 303).

In doing so, the change of the visual recognition distance M is completed.

In the following steps, the processing in Step 104 and the following steps in the flowchart according to the first exemplary embodiment as illustrated in FIG. 5 may be executed. In addition, the processing in Step 201 and the following steps in the flowchart according to the second exemplary embodiment as illustrated in FIG. 4 may be performed.

The changed visual recognition distance M' may be set depending on print data.

Fourth Exemplary Embodiment

According to the first to third exemplary embodiments, it is assumed that a single printing device 1 performs printing of print data. According to a fourth exemplary embodiment, plural printing devices 1 are coupled to perform printing of print data.

For example, two printing devices 1 (printing devices 1a and 1b) are coupled, the printing device 1a on the upstream side performs printing on the front side of the paper, and the printing device 1b on the downstream side performs printing on the back side of the paper. The two printing devices 1 (printing devices 1a and 1b) are assumed to have the same configuration.

Here, the printing device 1a on the upstream side is an example of the first printing device, and the printing device 1b on the downstream side is an example of the second printing device.

FIGS. 9A and 9B are explanatory diagrams of a case in which the two printing devices 1a and 1b are coupled. FIG. 9A is an explanatory diagram of the configuration of the printing devices 1a and 1b, and FIG. 9B is an explanatory diagram of a state of printing on the paper.

Here, a configuration including plural printing devices 1 such as the printing device 1a on the upstream side and the printing device 1b on the downstream side will be described as a printing system.

In this case, a single control page (job separator page) is assumed to be included at the top of the print data. Therefore, the print data is transmitted in an order of the control page (job separator page), a blank page, and user pages #1, #2, #3, #4, #5, #6, . . . .

Therefore, the printing device 1a on the upstream side performs printing in an order of the control page (job separator page) and the user pages #1, #3, #5, . . . .

In contrast, the printing device 1b on the downstream side performs printing in an order of the blank page and the user pages #2, #4, #6, . . . .

The user page #1 corresponds to the page as a target of the print check in the printing device 1a on the upstream side, and the user page #2 corresponds to the page as a target of the print check in the printing device 1b on the downstream side.

At this time, the print start instruction unit 113 of the control unit 10 in the printing device 1a on the upstream side sequentially inspects (analyzes) the print data and performs identification between the control pages and the user pages as described above in the first exemplary embodiment. Therefore, the printing device 1a on the upstream side detects the control pages (the job separator, and the blank page). Accordingly, the stop page number P may be set by the control unit 10 in the printing device 1b on the downstream side in consideration of the control pages if information about the detection of the control pages is provided from the printing device 1a on the upstream side to the printing device 1b on the downstream side. In doing so, the print start instruction unit 113 of the control unit 10 in the printing device 1b on the downstream side is not required to inspect (analyze) the print data.

The print check switch 31 is provided in each of the printing device 1a on the upstream side and the printing device 1b on the downstream side.

If the print check switch 31 in the printing device 1a on the upstream side is pressed and the print check mode is set, the printing is stopped so as to perform the print check of the user page #1.

If the print check switch 31 in the printing device 1b on the downstream side is pressed and the print check mode is set, the printing is stopped at a position at which the print check of the user page #2 may be performed.

The printing device 1a on the upstream side and the printing device 1b on the downstream side are designed such that if one of the printing device 1a and the printing device 1b is in the print check mode and stops the printing, the other also stops the printing.

Here, a dedicated code may be provided to the control page (job separator page) as described above in the first exemplary embodiment, and also, a dedicated code indicating a control page may be added to the blank page.

In addition, the dedicated code may be added to the blank page when the print data is transmitted from the printing device 1a on the upstream side to the printing device 1b on the downstream side.

In doing so, the host computer 2 is not required to recognize that the print data has been printed by plural printing devices 1.

Fifth Exemplary Embodiment

According to the first to fourth exemplary embodiments, the distance between the printing mechanism unit 21 and the visual recognition unit 22 in the printing device 1 is assumed to be the visual recognition distance M.

However, the visual recognition distance M differs depending on a configuration (device configuration) of the printing device 1.

Thus, a table of the visual recognition distances M for printing devices 1 with different device configurations is stored (saved) in the storage unit 116 according to the fifth exemplary embodiment. In addition, the visual recognition distance M of the corresponding printing device 1 is read in the print check mode in accordance with the configuration of the printing device 1, and the stop page number P is calculated.

Figure 10A:
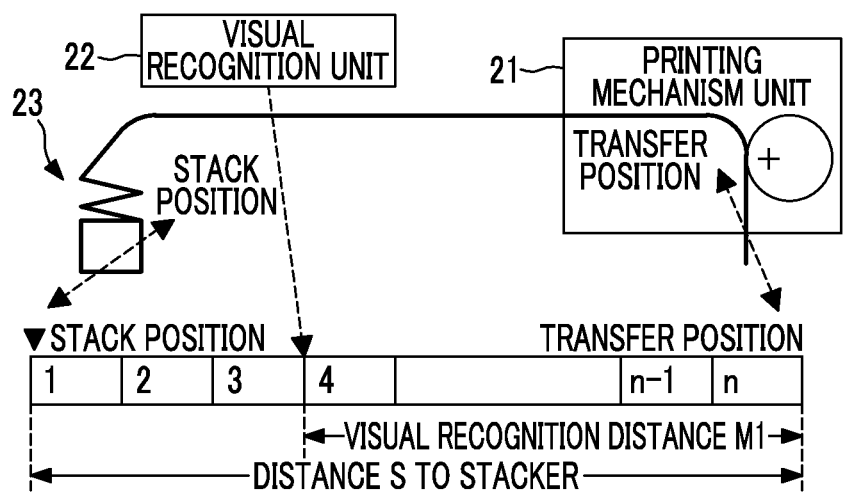
FIGS. 10A to 10C are explanatory diagrams of the visual recognition distance M in printing devices with different configurations, where
Figure 10B:
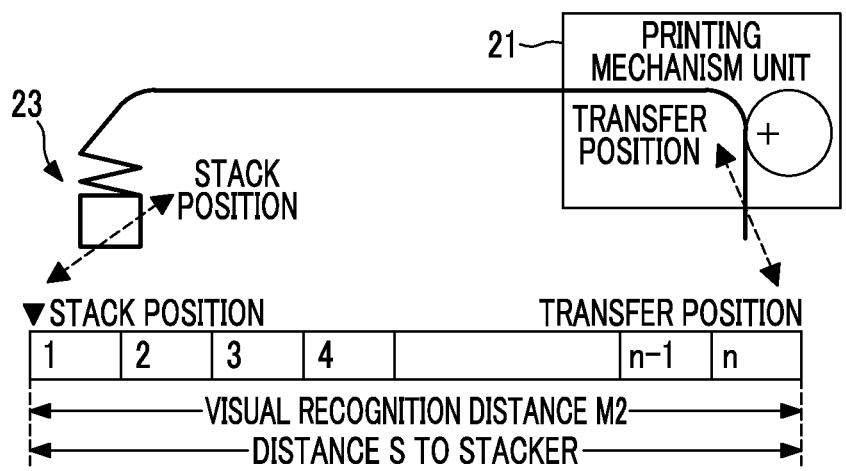
Figure 10C:
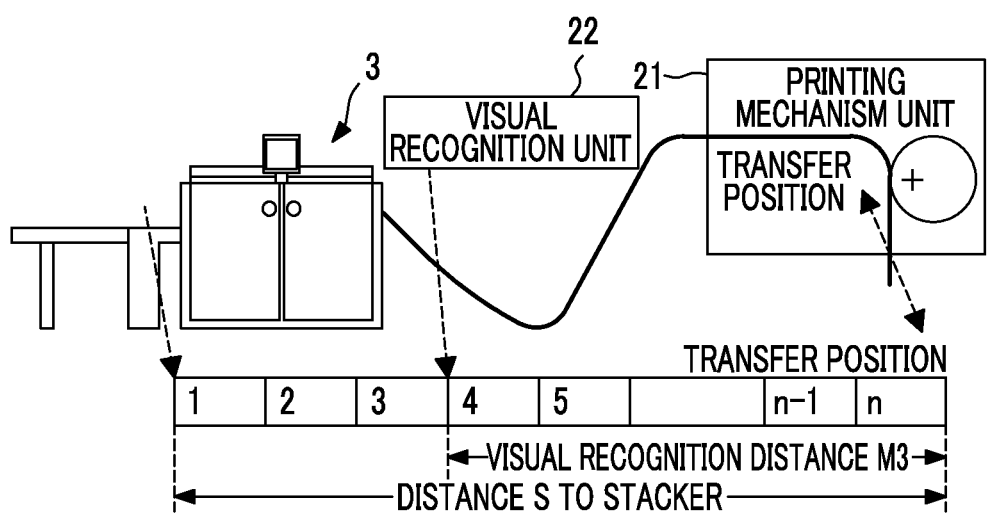

FIGS. 10A to 10C are explanatory diagrams of visual recognition distances M in the printing devices 1 with different configurations. FIG. 10A illustrates an exemplary printing device 1 that includes the visual recognition unit 22 provided therein, FIG. 10B illustrates an exemplary printing device 1 that does not include the visual recognition unit 22 therein and performs visual recognition by a stacker 23, and FIG. 10C illustrates an exemplary printing device 1 that includes the post-processing device 3 and the visual recognition unit 22 provided before the post-processing device 3.

As illustrated in FIG. 10A, a visual recognition distance M1 in the printing device 1 that includes the visual recognition unit 22 provided therein is from the printing mechanism unit 21 to the visual recognition unit 22. The printing device 1 will be described as a single device (provided with the visual recognition unit 22 and the stacker 23).

As illustrated in FIG. 10B, the stacker 23 performs the print check in the printing device 1 that does not include the visual recognition unit 22 therein. In such a case, a visual recognition distance M2 is from the printing mechanism unit 21 to the stacker 23. The printing device 1 will be described as a single device (provided with the stacker 23).

As illustrated in FIG. 10C, a visual recognition distance M3 in the printing device 1 that includes the visual recognition unit 22 before the post-processing device 3 is from the printing mechanism unit 21 to the visual recognition unit 22 before the post-processing device 3. The printing device 1 will be described as a single device (provided with the post-processing device 3).

FIGS. 11A and 11B are an exemplary flowchart of a method of setting the visual recognition distance M when the visual recognition distance M differs depending on the configuration of the printing device 1 and an exemplary reference table LUT that is stored in the storage unit 116. FIG. 11A is the explanatory flowchart of the method of setting the visual recognition distance M, and FIG. 11B is an exemplary reference table LUT.

As illustrated in FIG. 11B, the visual recognition distance M is calculated in advance for each configuration of the printing device 1 and is stored in the reference table LUT in the storage unit 116. Here, visual recognition distances M (M1 to M8) are stored in association with the numbers of configurations (configurations 0 to 7).

As illustrated in FIG. 10A, the visual recognition distances M (M1 to M8) area read from the reference table LUT in the storage unit 116 (Step 401).

Next, the configuration of the corresponding printing device 1 is read from the ROM 12, for example, of the printing device 1 (Step 402).

Then, it is determined which of the configurations 0 to 7 the configuration of the printing device 1 corresponds to (Step 403).

Then, the visual recognition distance M corresponding to the configuration of the printing device 1 is stored in the storage unit 116 (Step 404).

Since the following processing is the same as that in the first exemplary embodiment, the description thereof will be omitted.

Sixth Exemplary Embodiment

According to the first to fifth exemplary embodiments, it is assumed that continuous paper such as a continuous form is fed to the printing device 1 without finishing.

However, there is a case in which the continuous paper finishes and is replenished.

Figure 12:
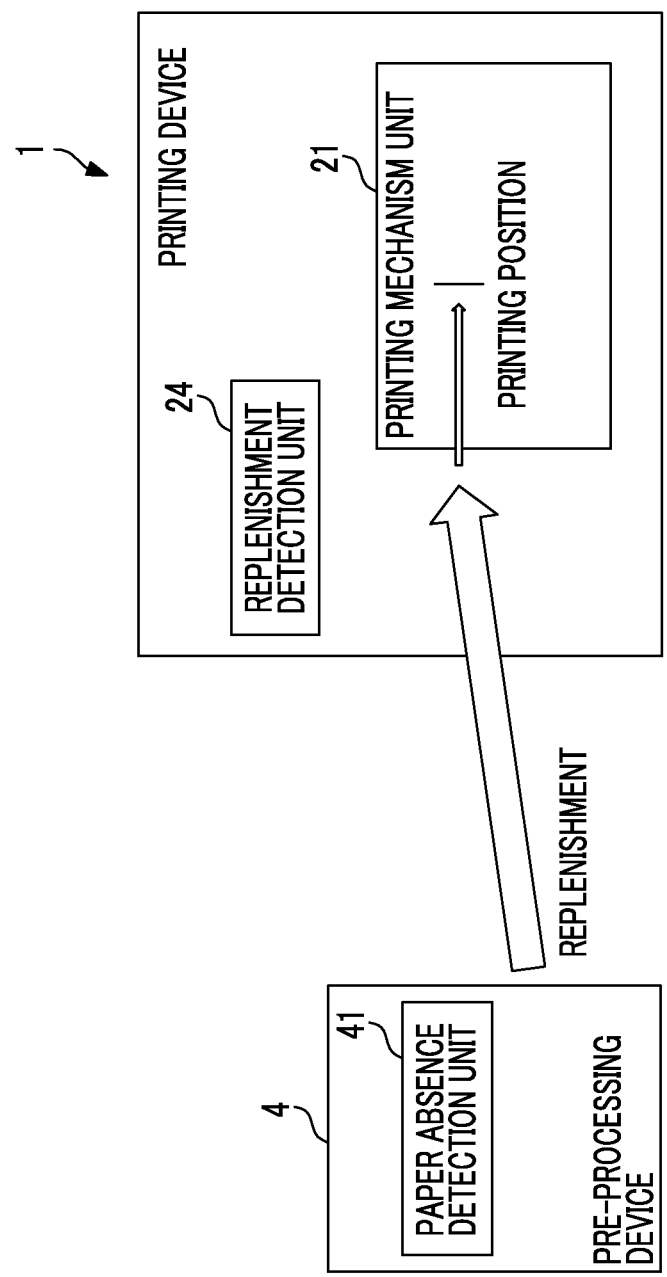
FIG. 12 is an explanatory diagram of a configuration of a printing device according to a sixth exemplary embodiment.

FIG. 12 is an explanatory diagram of a configuration of a printing device 1 according to the sixth exemplary embodiment.

The printing device 1 is provided with a pre-processing device 4 that supplies paper to the outside. In addition, the pre-processing device 4 is provided with a paper absence detection unit 41. Moreover, the printing device 1 is provided with a replenishment detection unit 24 that detects whether or not paper has been replenished. Since the other configurations are the same as those described above in the first exemplary embodiment, different parts will be described, and the descriptions of the same parts will be omitted.

Here, the replenishment detection unit 24 is an example of the replenishment detection unit.

If the paper absence detection unit 41 in the pre-processing device 4 detects absence of the paper, the paper absence detection unit 41 provided information about the absence of the paper to the printing device 1.

The printing device 1 receives the information about the absence of the paper and then stops the printing.

Then, the operator refills the pre-processing device 4 with the paper and supplies the replenished paper to the printing device 1. At this time, a punch hole or the like is provided to mark the replenished position.

No print check has been performed on the replenished paper. Therefore, the operator presses the print check switch 31 to shift to the print check mode.

Then, the replenishment detection unit 24 in the printing device 1 detects the replenished position based on the punch hole or the like. Thus, the page number calculation unit 112 resets the stop page number P. Then, the count unit 114 counts the number of pages, on which the printing unit 20 has performed printing, on the replenished paper and obtains the count number C.

Then, the print stop instruction unit 115 causes the printing unit 20 to stop the printing when the stop page number P coincides with the count number C.

In doing so, the first user page on the replenished paper is arranged at a position, at which visual recognition may be made, in the visual recognition unit 22.

If only the replenishment of the paper is performed and no control page is included, it is not necessary to change the stop page number P and the count number C.

In addition, a control page may be added to the print data. In such a case in which the control page is added, it is only necessary to apply "+1" to the stop page number P and to maintain the count number C as described above in the first and second exemplary embodiments.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing device comprising:
    at least one processor configured to:
    receive print data;
    before executing a stop printing operation:
    calculate a total number of pages using a page length of the received print data and a distance from a printer to a visual recognition part; and
    change the total number of pages to be printed or a number of printed pages and perform print processing in response to the received print data corresponding to a control page for controlling printing; and
    executing the stop printing operation in response to the number of printed pages coinciding with the total number of pages to be printed,
    wherein the at least one processor is further configured to, before the executing the stop printing operation, change the distance from the printer to the visual recognition part from an actual value to a logical value and calculate the number of pages to be printed.

2. The printing device according to claim 1,
    wherein the at least one processor is further configured, before the executing the stop printing operation, to increase the count of the number of pages to be printed in response to executing printing of the control page.

3. The printing device according to claim 2,
    wherein a code indicating the control page is configured to be added to the control page in the print data.

4. The printing device according to claim 2, further comprising:
    a storage configured to store distances from a plurality of printers corresponding to a plurality of device configurations to the visual recognition part in a table,
    wherein the at least one processor is further configured to, before the executing the stop printing operation, read the distance from the printing mechanism corresponding to an own device configuration to the visual recognition part from the table in the storage and calculate the number of pages to be printed before executing the stop printing operation.

5. The printing device according to claim 1,
    wherein the at least one processor is configured to, before the executing the stop printing operation, maintain the count of the number of pages to be printed in response to executing printing of the control page.

6. The printing device according to claim 5,
    wherein a code indicating the control page is configured to be added to the control page in the print data.

7. The printing device according to claim 5, further comprising:
    a storage configured to store distances from a plurality of printers corresponding to a plurality of device configurations to the visual recognition part in a table,
    wherein the at least one processor is further configured to, before the executing the stop printing operation, read the distance from the printer corresponding to an own device configuration to the visual recognition part from the table in the storage and calculate the number of pages to be printed before executing the stop printing operation.

8. The printing device according to claim 1,
    wherein a code indicating the control page is configured to be added to the control page in the print data.

9. The printing device according to claim 1, further comprising:
    a storage configured to store distances from a plurality of printers corresponding to a plurality of device configurations to the visual recognition part in a table,
    wherein the at least one processor is further configured to, before the executing the stop printing operation, read the distance from the printing mechanism corresponding to an own device configuration to the visual recognition part from the table in the storage and calculate the number of pages to be printed before executing the stop printing operation.

10. The printing device according to claim 1, wherein the at least one processor is further configured to:
    detect replenishment of paper and, in response to detecting
    the replenishment of the paper, the calculate the number of pages to be printed before stopping the printing to replenish paper.

11. A printing device comprising:
    at least one processor configure to
    sequentially print a plurality of pages on continuous paper, on which a form is printed in advance, using print data including a control page for controlling printing and a user page required by a user;
    a visual recognition part configured to visually recognize a print state on paper on which the print data is printed;
    wherein the at least one processor is further configured to:
    calculate a number of pages to be printed before stopping printing using a page length obtained from the print data and a visual recognition distance from the printer to the visual recognition part;

accumulate a number of pages on which the printer is configured to print and determines the number of pages to be a number of printed pages;

before executing a stop printing operation change the number of pages to be printed or the number of printed pages and perform print processing in response to a page to be printed by the printer being the control page;

stop the printing by the printer for visual recognition of a user page to be checked through the visual recognition part in response to the number of pages to be printed coinciding with the number of printed pages; and change the distance from the printer to the visual recognition part from an actual value to a logical value and calculate the number of pages to be printed before executing the stop printing operation.

12. A printing system comprising:

a first printing device coupled to a second printing device, wherein the first printing device comprises at least one first processor and the second printing device comprises at least one second processor, the at least one first processor and the at least one second processor are configured to:

receive data;

before executing a stop printing operation:

calculate a total number of pages to be printed using a page length of the received print data and a distance from a printer to a visual recognition part;

change the number of pages to be printed and perform print processing in response to the received print data corresponding to a control page for controlling printing; and executing the stop printing operation in response to the number of printed pages coinciding with the number of pages to be printed before executing the stop printing operation, wherein the at least one first processor in the first printing device is further configured to, before the executing the stop printing operation, set the number of pages to be printed in the second printing device in response to the received print data including a control page for controlling printing by the second printing device, and wherein in response to one of the first printing device and the second printing device executing the stop printing operation, the other one of the first printing device and the second printing device also executes the stop printing operation, and wherein the at least one first processor and the at least one second processor are further configured to change the distance from the printer to the visual recognition part from an actual value to a logical value and calculate the number of pages to be printed before executing the stop printing operation.

* * * * *